(12) United States Patent
Kim et al.

(10) Patent No.: US 11,836,463 B2
(45) Date of Patent: Dec. 5, 2023

(54) METHOD AND APPARATUS WITH NEURAL NETWORK PROCESSING

(71) Applicant: Samsung Electronics Co., Ltd., Suwon-si (KR)

(72) Inventors: Minje Kim, Hwaseong-si (KR); Soonwan Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 478 days.

(21) Appl. No.: 17/106,266

(22) Filed: Nov. 30, 2020

(65) Prior Publication Data

US 2022/0019408 A1    Jan. 20, 2022

(30) Foreign Application Priority Data

Jul. 17, 2020    (KR) .......................... 10-2020-0089166

(51) Int. Cl.
*G06F 7/544*    (2006.01)
*G06G 7/16*    (2006.01)
(Continued)

(52) U.S. Cl.
CPC .............. *G06F 7/5443* (2013.01); *G06F 7/57* (2013.01); *G06F 9/3001* (2013.01); *G06G 7/16* (2013.01); *G06N 3/063* (2013.01)

(58) Field of Classification Search
CPC ........ G06F 7/523; G06F 7/5443; G06F 17/16; G06F 17/15; G06F 17/153;
(Continued)

(56) References Cited

U.S. PATENT DOCUMENTS

| 10,901,492 B1 * | 1/2021 | Bshara .................... G06F 1/329 |
| 2012/0109866 A1 | 5/2012 | Modha |

(Continued)

FOREIGN PATENT DOCUMENTS

| KR | 10-2018-0125283 A | 11/2018 |
| KR | 10-2019-0053262 A | 5/2019 |

OTHER PUBLICATIONS

Wikipedia. "Shift Register." Wikipedia, Dec. 18, 2017, en.wikipedia.org/w/index.php?title=Shift_register&oldid=815988398. (Year: 2017).*

(Continued)

*Primary Examiner* — Jyoti Mehta
*Assistant Examiner* — Huy Duong
(74) *Attorney, Agent, or Firm* — NSIP Law

(57) ABSTRACT

A neural network device includes a shift register circuit, a control circuit, and a processing circuit. The shift register circuit includes registers configured to, in each cycle of cycles, transfer stored data to a next register and store new data received from a previous register to a current register. The control circuit is configured to sequentially input data of input activations included in an input feature map into the shift register circuit in a preset order. The processing circuit, includes crossbar array groups that receive input activations from at least one of the registers and perform a multiply-accumulate (MAC) operation with respect to the received input activation and weights, is configured to accumulate and add at least some operation results output from the crossbar array groups in a preset number of cycles to obtain an output activation in an output feature map.

20 Claims, 9 Drawing Sheets

(51) Int. Cl.
*G06F 9/30* (2018.01)
*G06F 7/57* (2006.01)
*G06N 3/063* (2023.01)

(58) Field of Classification Search
CPC ..... G06F 15/7821; G06F 15/785; G06G 7/16; G06N 3/04; G06N 3/063; G06N 3/08; G11C 13/0002
See application file for complete search history.

(56) References Cited

U.S. PATENT DOCUMENTS

| | | | |
|---|---|---|---|
| 2017/0116495 A1* | 4/2017 | Nomura | G06N 3/08 |
| 2018/0113649 A1* | 4/2018 | Shafiee Ardestani | G11C 13/0002 |
| 2019/0138892 A1 | 5/2019 | Kim et al. | |
| 2020/0012608 A1* | 1/2020 | Woo | G06N 20/10 |
| 2020/0081687 A1* | 3/2020 | Okumura | G06F 7/483 |
| 2020/0082255 A1 | 3/2020 | Kataeva | |
| 2020/0150923 A1* | 5/2020 | Muralimanohar | G06F 7/5443 |
| 2021/0240443 A1* | 8/2021 | Chang | G11C 13/004 |
| 2021/0279556 A1* | 9/2021 | Gokmen | G11C 13/004 |

OTHER PUBLICATIONS

Yin, et al. "XNOR-SRAM: In-memory computing SRAM macro for binary/ternary deep neural networks." *IEEE Journal of Solid-State Circuits* 55.6 (2020): 1733-1743. (11 pages in English).

* cited by examiner

METHOD AND APPARATUS WITH NEURAL NETWORK PROCESSING

CROSS-REFERENCE TO RELATED APPLICATION

This application claims the benefit under 35 U.S.C. § 119 to Korean Patent Application No. 10-2020-0089166, filed on Jul. 17, 2020, in the Korean Intellectual Property Office, the entire disclosure of which is incorporated herein by reference for all purposes.

BACKGROUND

1. Field

The present disclosure relates to method and apparatus with neural network processing.

2. Description of Related Art

A neuromorphic processor may be, or used in, a neural network device that drives various neural networks, such as a Convolutional Neural Network (CNN), a Recurrent Neural Network (RNN), and a Feedforward Neural Network (FNN), and may also be used for data classification, image recognition, etc.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network device includes a shift register circuit, a control circuit, and a processing circuit. The shift register circuit includes registers configured to, in each cycle of cycles, transfer stored data to a next register and store new data received from a previous register to a current register. The control circuit is configured to sequentially input data of input activations included in an input feature map into the shift register circuit in a preset order. The processing circuit, includes crossbar array groups that receive input activations from at least one of the registers and perform a multiply-accumulate (MAC) operation with respect to the received input activation and weights, is configured to accumulate and add at least some operation results output from the crossbar array groups in a preset number of cycles to obtain an output activation in an output feature map.

The control circuit may be further configured to receive a 1-bit zero mark on each of the cycles, and, in response to the value of the zero mark being 1, control the crossbar array groups to omit a MAC operation with respect to input activations corresponding to the zero mark.

Crossbar arrays included in one crossbar array group of the crossbar array groups may share a same input activation.

Each of the crossbar arrays may include row lines, column lines intersecting the row lines, and memory cells. The memory cells are disposed at the intersections of the row lines and the column lines, and configured to store the weights included in a weight kernel.

The processing circuit may be further configured to obtain a first output activation using an operation result output from one of the crossbar arrays, and obtain a second output activation using an operation result output from another of the crossbar arrays.

A number of the crossbar arrays included in the one crossbar array group may correspond to a width of a weight kernel.

A number of registers that transfer input activation to the crossbar array groups from the registers may correspond to a height of a weight kernel.

The processing circuit may be further configured to select at least some of the operation results output from the crossbar array groups, convert the selected operation results into a 2's complement format, and accumulate and add the converted operation results to obtain the output activation.

The processing circuit may include an output line through which the output activation is output, and the output line may correspond to an output of one of a plurality of layers constituting a neural network, and may be directly connected to an input line of a next layer.

The next layer may include either one or both of a convolution layer and a pooling layer.

In another general aspect, an operating method of a neural network device includes sequentially inputting input activations included in an input feature map into a shift register circuit in a preset order, receiving an input activation of the input activations from at least one of a plurality of registers of the shift register circuit from a corresponding crossbar array group of crossbar array groups and performing a multiply-accumulate (MAC) operation on the received input activation and weights, and obtaining an output activation included in an output feature map by accumulating and adding at least some of the calculation results output from the crossbar array groups in units of a preset number of cycles.

The operating method may further include receiving a 1-bit zero mark on each cycle of the sequentially inputting of the input activations, and in response to the value of the zero mark being 1, controlling the crossbar array groups to omit the MAC operation with respect to input activations corresponding to the zero mark.

Crossbar arrays included in one crossbar array group of the crossbar array groups may share a same input activation Each of the crossbar arrays may include row lines, column lines intersecting the row lines, and memory cells disposed at the intersections of the row lines and the column lines, and configured to store the weights of a weight kernel.

The operating method may further include obtaining a first output activation using an operation result output from one of the crossbar arrays, and obtaining a second output activation using an operation result output from another crossbar array of the crossbar arrays.

A number of the crossbar arrays included in the one crossbar array group may correspond to a width of a weight kernel.

A number of registers that transfer input activation to the crossbar array groups from the plurality of registers may correspond to a height of a weight kernel.

The obtaining the output activation may include selecting at least some operation results output from the crossbar array groups, converting the selected operation results into a 2's complement format, and accumulating and adding the converted operation results.

The operating method may further include outputting the output activation via an output line. The output line may correspond to an output of one of a plurality of layers constituting a neural network, and may be directly connected to an input line of a next layer.

The next layer may include either one or both of a convolutional layer and a pooling layer.

In another general aspect, a neural network device includes a shift register circuit and a processing circuit. The shift register circuit includes registers configured to sequentially transfer input activations of an input feature map to registers. The processing circuit, includes crossbar array groups configured to receive input activations from a subset of the registers, perform a multiply-accumulate (MAC) operation on the received input activation and weights, and output activation of an output feature map by accumulating and adding calculation results output from the crossbar array groups in predetermined number of cycles.

The registers may be further configured to receive a 1-bit zero mark on each cycle of the sequentially transferring of the input activations, and in response to the value of the zero mark being 1, may control the crossbar array groups to omit the MAC operation with respect to input activations corresponding to the zero mark.

Crossbar arrays included in one crossbar array group of the crossbar array groups may share a same input activation Each of the crossbar arrays may include row lines, column lines intersecting the row lines, and memory cells, disposed at the intersections of the row lines and the column lines, configured to store the weights of a weight kernel.

A number of the crossbar arrays included in the one crossbar array group may correspond to a width of a weight kernel.

The outputting of activation may include selecting at least some operation results output from the crossbar array groups, converting the selected operation results into a 2's complement format, and accumulating and adding the converted operation results.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
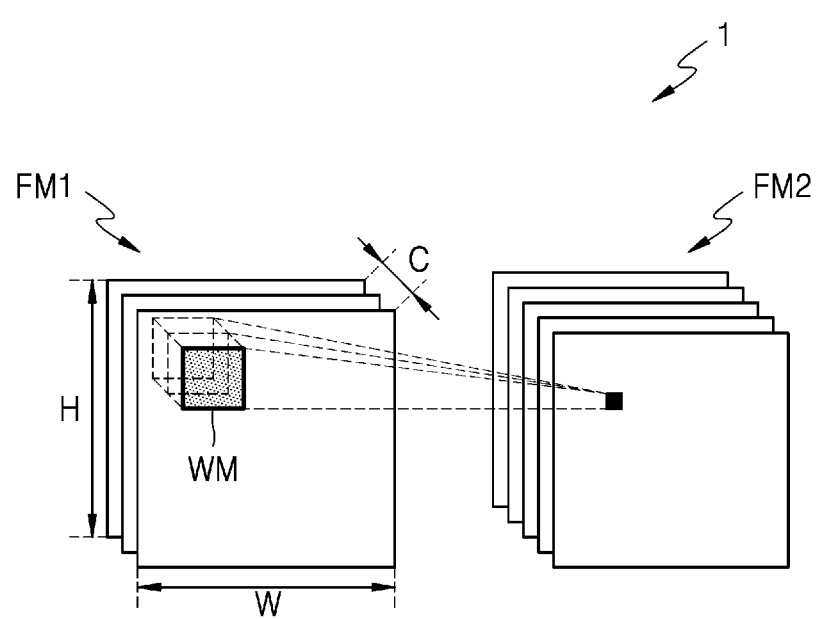
FIG. 1 is a diagram explaining an architecture of a neural network according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a predetermined order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Terminologies used herein are selected as commonly used by those of ordinary skill in the art in consideration of functions of the current embodiment, but may vary according to the technical intention, precedents, or a disclosure of a new technology. Also, in particular cases, some terms are arbitrarily selected by the applicant, and in this case, the meanings of the terms will be described in detail at corresponding parts of the specification. Accordingly, the terms used in the specification should be defined not by simply the names of the terms but based on the meaning and contents of the whole specification.

FIG. 1 is a diagram explaining an architecture of a neural network according to one or more embodiments.

In FIG. 1, the neural network 1 may be represented by a mathematical model by using nodes and edges. The neural network 1 may include an architecture of a deep neural network (DNN) or n-layers neural networks. The DNN or n-layers neural networks may correspond to convolutional neural networks (CNNs), recurrent neural networks (RNNs), deep belief networks, restricted Boltzman machines, etc. For example, the neural network 1 may be implemented as a CNN, but is not limited thereto. The neural network 1 of FIG. 1 may correspond to some layers of the CNN. Accordingly, the neural network 1 may correspond to a convolutional layer, a pooling layer, or a fully connected layer, etc. of a CNN. However, for convenience, in the following descriptions, it is assumed that the neural network 1 corresponds to the convolutional layer of the CNN.

In such a convolution layer, a first feature map 1 FM1 may correspond to an input feature map and a second feature map FM2 may correspond to an output feature map. The feature map may denote a data set representing various characteristics of input data. The first and second feature maps FM1 and FM2 may be a high-dimensional matrix of two or more dimensions, and have respective activation parameters. When the first and second feature maps FM1 and FM2 correspond to, for example, three-dimensional feature maps, the first and second feature maps FM1 and FM2 have a width W (or column), a height H (or row), and a depth C. At this point, the depth C may correspond to the number of channels.

In a convolution layer, a convolution operation with respect to the first feature map FM1 and a weight map WM may be performed, and as a result, the second feature map FM2 may be generated. The weight map WM may filter the first feature map FM1 and is referred to as a weight filter or weight kernel. In one example, a depth of the weight map WM, that is, the number of channels is the same as the depth of the first feature map FM1, that is, the number of channels. The weight map WM is shifted by traversing the first feature map FM1 as a sliding window. In each shift, weights included in the weight map WM may respectively be multiplied and added to all feature values in a region overlapping with the first feature map FM1. As the first feature map FM1 and the weight map WM are convolved, one channel of the second feature map FM2 may be generated.

In FIG. 1, although one weight map WM is depicted, a plurality of channels of the second feature map FM2 may be generated by respectively convolving a plurality of weight maps with the first feature map FM1. The second feature map FM2 of the convolution layer may then be used as an input feature map of the next layer. For example, the second feature map FM2 may be an input feature map of a pooling layer. But the present embodiment is not limited thereto.

Figure 2:
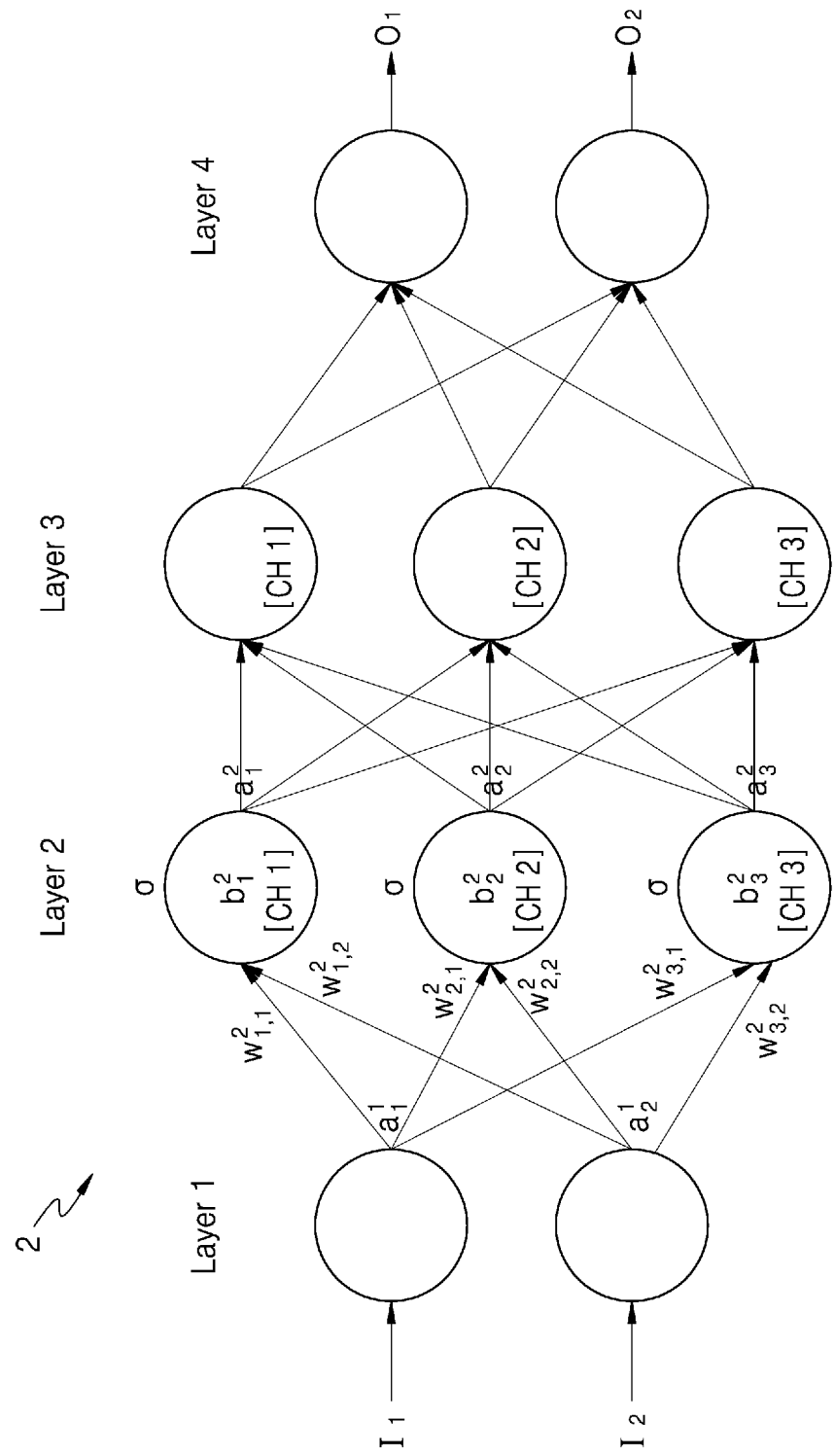
FIG. 2 is a diagram explaining an operation performed in a neural network according to one or more embodiments.

FIG. 2 is a diagram explaining an operation performed in a neural network 2 according to one or more embodiments.

In FIG. 2, the neural network 2 may have a structure that incudes input layers, hidden layers, and output layers, and may perform operations based on received input data (for example, $I_1$ and $I_2$), and may generate output data (for example, $O_1$ and $O_2$) based on a result of the operations.

As described above, the neural network 2 may be a DNN or an n-layer neural network including two or more hidden layers. For example, as illustrated in FIG. 2, the neural network 2 may be a DNN including an input layer (Layer 1), two hidden layers (Layer 2 and Layer 3), and an output layer (Layer 4). When the neural network 2 is implemented as a DNN architecture, the neural network 2 includes a further large number of layers capable of processing valid information, and thus, the neural network 2 may process a large number of complex data sets than a neural network having a single layer. However, although the neural network 2 is illustrated as including four layers, but this is only an example, and the neural network 2 may include a lesser or greater number of layers, or a lesser or greater number of channels. That is, the neural network 2 may include layers of various structures different from those illustrated in FIG. 2.

Each of the layers included in the neural network 2 may include a plurality of channels. A channel may correspond to a plurality of artificial nodes, known as neurons, processing elements (PEs), units, or similar terms. For example, as illustrated in FIG. 2, the Layer 1 may include two channels (nodes), and each of the Layer 2 and Layer 3 may include three channels. However, this is only an example, and each of the layers included in the neural network 2 may include various numbers of channels (nodes).

The channels included in each of the layers of the neural network 2 may be connected to each other to process data. For example, one channel may receive data from other channels for an operation and output the operation result to other channels.

Each of inputs and outputs of each of the channels may be referred to as an input activation and an output activation. That is, the activation may be an output of one channel and may be a parameter corresponding to an input of channels included in the next layer.

Each of the channels may determine its own activation based on activations received from channels included in the previous layer and appropriate weights. The weights are parameters used to operate an output activation in each channel, and may be values assigned to connection relationships between channels.

Each of the channels may be processed by, for example, a hardware computational unit or processing element that outputs an output activation by receiving an input, and an input-output of each of the channels may be mapped. For example, when a is an activation function, $w_{jk}^i$ is a weight from a $k^{th}$ channel included in an $(i-1)^{th}$ layer to a $j^{th}$ channel included in an $i^{th}$ layer, $b_j^i$ is a bias of the $j^{th}$ channel included in the $i^{th}$ layer, and $a_j^i$ is an activation of the $j^{th}$ channel in the $i^{th}$ layer, the activation $a_j^i$ may be calculated by using Equation 1 below.

$$a_j^i = \sigma\left(\sum_k (w_{jk}^i \times a_k^{i-1}) + b_j^i\right) \quad \text{Equation 1}$$

As shown in FIG. 2, the activation of a first channel CH1 of the second layer Layer 2 may be expressed as $a_1^2$. Also, $a_1^2$ may have a value of $a_1^2=\sigma(w_{1,1}^2 \times a_1^1 + w_{1,2}^2 \times a_2^1 + b_1^2)$ according to the Equation 1. The activation function a may be a Rectified Linear Unit (ReLU), but the present embodiment is not limited thereto. For example, the activation function σ may be sigmoid, hyperbolic tangent, Maxout, etc.

As described above, in the neural network 2, a large number of data sets are exchanged between a plurality of interconnected channels, and a number of computational processes are performed through layers. In this operation, a large number of MAC (multiply-accumulate) operations are performed, and a large number of memory access operations must be typically performed to load activations and weights, which are operands of MAC operations, at an appropriate time.

On the other hand, a typical digital computer uses a Von Neumann structure in which a computation unit and a memory are separated and includes a common data bus for data transmission between two separated blocks. Accordingly, in the process of performing the neural network 2 in which data movement and operation are continuously repeated, typically, a lot of time to transmit data is required and excessive power may be consumed.

In one or more embodiments, an in-memory computing circuit may be desired as an architecture for integrating memory and a computation unit performing MAC operations into one, for example.

Figure 3:
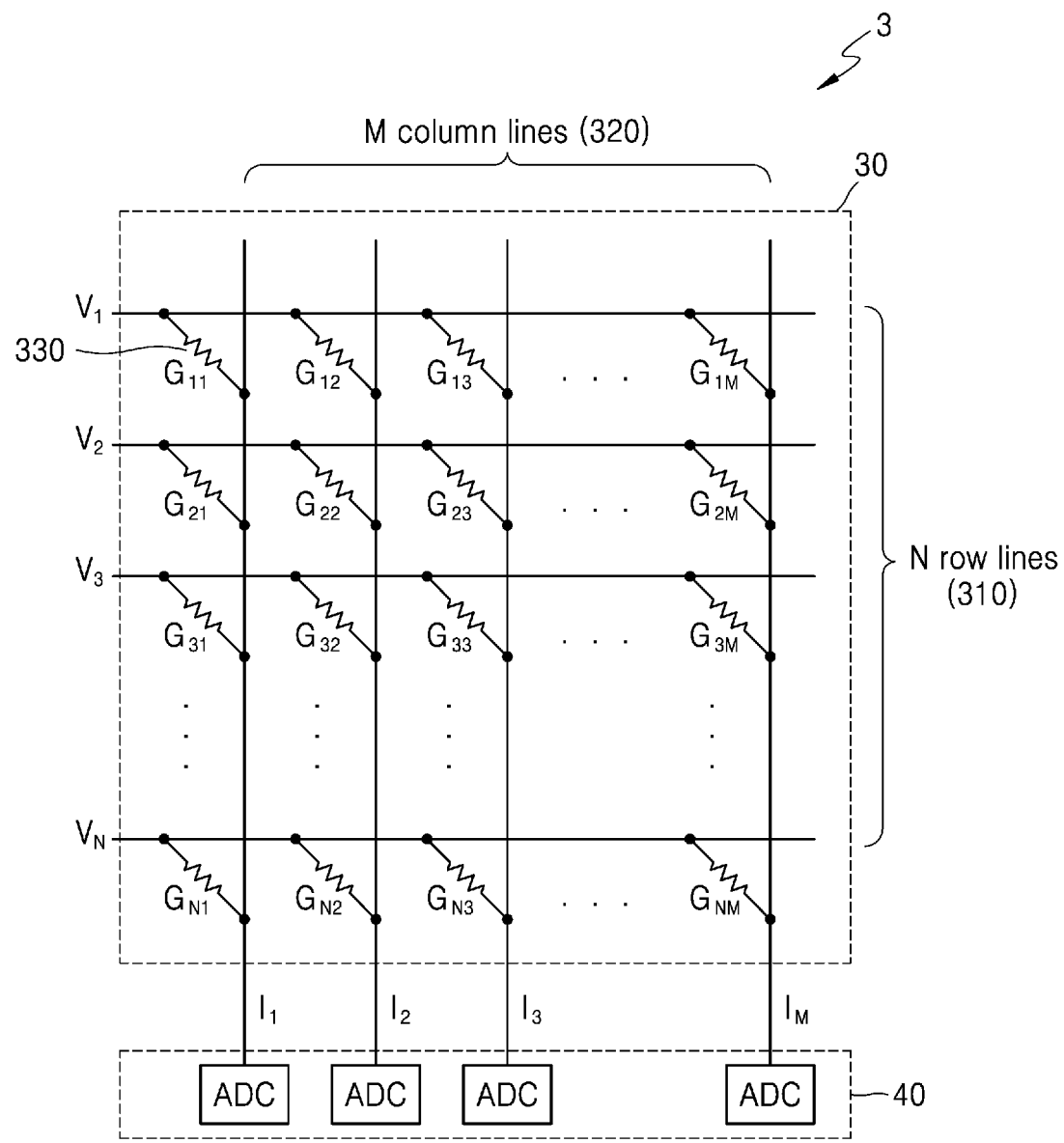
FIG. 3 is a diagram illustrating an in-memory computing circuit according to one or more embodiments.

FIG. 3 is a diagram illustrating an in-memory computing circuit 3 according to one or more embodiments.

In FIG. 3, the in-memory computing circuit 3 may include an analog crossbar array 30 and an analog to digital converter (ADC) 40. However, only components related to the present embodiments are depicted in the in-memory computing circuit 3 illustrated in FIG. 3. Accordingly, it will be apparent after an understanding of the disclosure of this application that other components other than, or in addition to, the components shown in FIG. 3 may further be included in the in-memory computing circuit 3.

The analog crossbar array 30 may include a plurality of row lines 310, a plurality of column lines 320, and a plurality of memory cells 330. The plurality of row lines 310 may be used to receive input data. For example, when the plurality of row lines 310 is N (N is a natural number) row lines, voltages $V_1, V_2, \ldots, V_N$ corresponding to input activations may be applied to the N row lines. The plurality of column lines 320 may cross the plurality of row lines 310. For example, when the plurality of column lines 320 are M (M is a natural number) column lines, the plurality of column lines 320 and the plurality of row lines 310 may cross at N×M intersections.

In this example, a plurality of memory cells 330 may be disposed at intersections of the plurality of row lines 310 and the plurality of column lines 320. Each of the plurality of memory cells 330 may be implemented as a nonvolatile memory, such as ReRAM (Resistive RAM), MRAM (Magnetic RAM), or eFlash to store weights, but is not limited thereto. Each of the plurality of memory cells 330 may be a volatile memory, such as static random access memory (SRAM).

In the analog crossbar array 30 illustrated in FIG. 3, the plurality of memory cells 330 may include conductance $G_{11}, \ldots, G_{NM}$ corresponding to weights. When a voltage corresponding to an input activation is applied to each of the plurality of row lines 310, according to Ohm's law, a current having a size of I=V×G may be output through each memory cell 330. Since currents output from the memory cells arranged in a column line are summed together, the current sums $I_1, \ldots, I_M$ may be output along the plurality of column lines 320. The current sums $I_1, \ldots, I_M$ may correspond to the result of a MAC operation performed in an analog method.

The ADC 40 may convert the result of an analog MAC operation output from the analog crossbar array 30 (that is, the current sum $I_1, \ldots, I_M$) into a digital signal. The result of the MAC operation converted to a digital signal is output from the ADC 40 and may be used in a subsequent neural network operation process.

On the other hand, the in-memory computing circuit 3, as shown in FIG. 3, has the advantages of lower complexity of the core operation unit, less power consumption, and smaller circuit size than a digital computer. However, in a process of mapping a synaptic weight to which thousands or tens of thousands of neurons of the neural network model are connected to the in-memory computing circuit 3, a limitation on a physical size may occur. According to the present disclosure, a neural network device capable of operating a neural network at low power by using the in-memory computing circuit 3 having various advantages while satisfying the constraint on the physical size may be provided. Hereinafter, an efficient structure and operation method of a neural network device according to the present embodiment will be described in detail with reference to the drawings.

Figure 4:
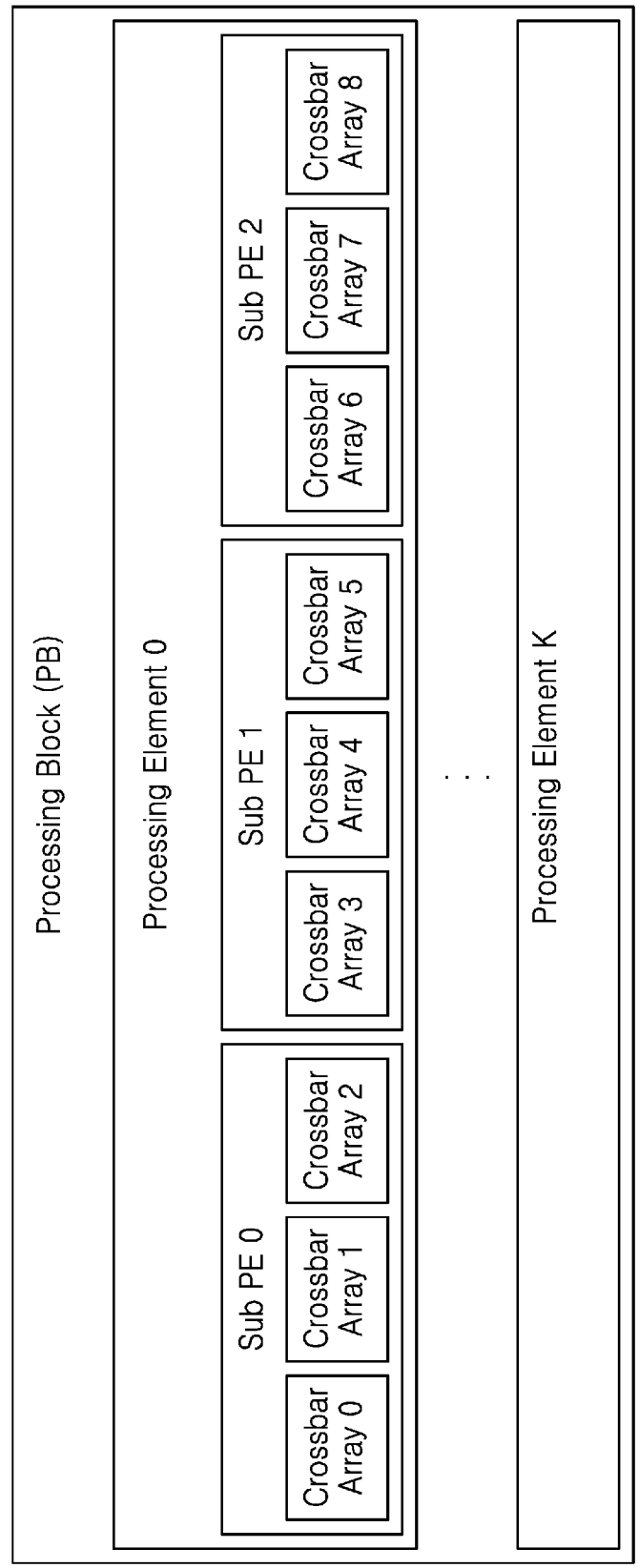
FIG. 4 is a diagram illustrating a configuration of a processing block included in a neural network device according to one or more embodiments.

FIG. 4 is a diagram illustrating a configuration of a processing block included in a neural network device according to one or more embodiments.

In FIG. 4, the neural network device may include a processing block 4. In FIG. 4, although only one processing block 4 is shown, the neural network device may include a plurality of processing blocks 4. Therefore, it will be apparent after an understanding of the disclosure of this application that other components other than, or in addition to, the components shown in FIG. 4 may further be included in the neural network device. For example, the neural network device may further include at least one control circuit 520.

At least one control circuit 520 may perform the overall function for controlling the neural network device. For example, the at least one control circuit 520 may control the operation of the processing block 4. In this example, the at least one control circuit 520 may be implemented as an array of a plurality of logic gates, and may be implemented as a combination of a general-purpose microprocessor and a memory in which a program executable in a microprocessor is stored.

The processing block 4 may perform a MAC operation after receiving data from an external memory or an internal memory of a neural network device, and may store a result of the MAC operation in a memory again. The processing block 4 may perform a pooling or activation function operation after completing a MAC operation with respect to one layer.

The processing block 4 may include a plurality of processing elements (Processing Element 0, ..., Processing Element K). K represents an arbitrary natural number. Each of the K processing elements (Processing Element 0, ..., Processing Element K) may include a plurality of sub-processing elements. For example, as shown in FIG. 4, Processing Element 0 may include three sub-processing elements (Sub PE 0, Sub PE 1 and Sub PE 2).

Each of the plurality of sub-processing elements may include a plurality of crossbar arrays. For example, in a non-limiting example, the Sub PE 0 may include 3 crossbar arrays (Crossbar Array 0, Crossbar Array 1 and Crossbar Array 2), and the Sub PE 1 may also include 3 crossbar arrays (Crossbar Array 3, Crossbar Array 4 and Crossbar Array 5), and the Sub PE 2 may also include three crossbar arrays (Crossbar Array 6, Crossbar Array 7 and Crossbar Array 8). In this way, a preset number of crossbar arrays may form one group, and one crossbar array group may correspond to a sub-processing element. In this example, since each of the plurality of crossbar arrays corresponds to the analog crossbar array 30 of FIG. 3, the descriptions thereof will be omitted.

Nine crossbar arrays included in one processing element may be used for a 3×3 convolution operation, for example. Hereinafter, a detailed process of performing a 3×3 convolution operation by a neural network device will be described in detail with reference to FIGS. 5 and 6.

For convenience of explanation of FIG. 4, an example in which one processing element includes three sub-processing elements and one sub-processing element includes three crossbar arrays have been described, as a non-limiting example. One processing element may include less than or greater than three sub-processing elements, and one sub-processing element may include less than or greater than three crossbar arrays. According to the configuration of the processing block 4 included in a neural network, neural network operations (e.g., convolution operations) of various sizes may be performed.

Figure 5:
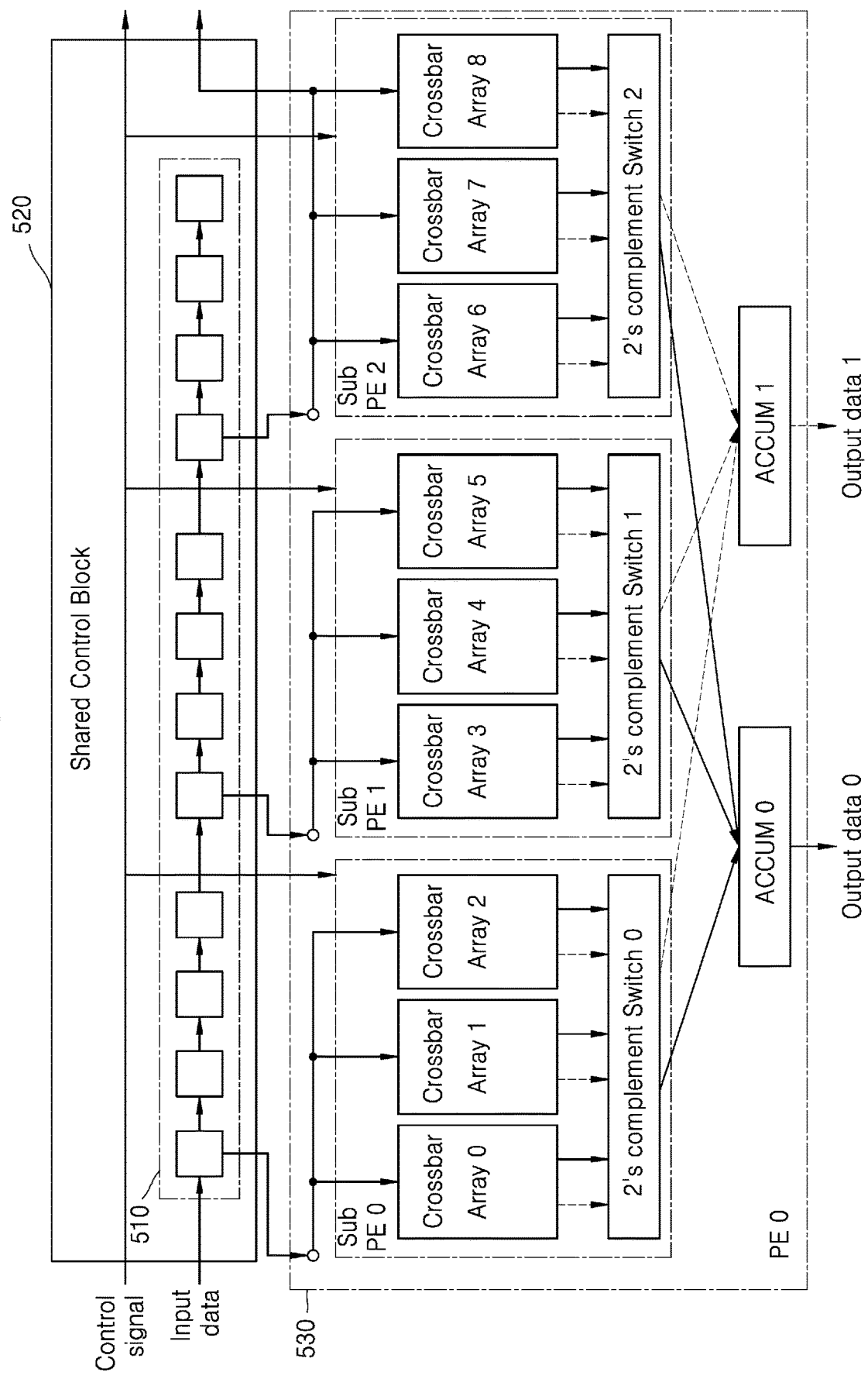
FIG. 5 is a diagram illustrating a circuit structure of a neural network device according to one or more embodiments.

FIG. 5 is a diagram illustrating a circuit structure of a neural network device according to one or more embodiments.

In FIG. 5, the neural network device may include a shift register circuit 510, a control circuit 520, and a processing circuit 530. In the neural network device illustrated in FIG. 5, only components related to the present embodiments are shown. Therefore, it will be apparent after an understanding of the disclosure of this application that other components other than, or in addition to, the components shown in FIG. 5 may further be included in the neural network device.

The shift register circuit 510 may include a plurality of registers that transfer stored data to the next register on every cycle and store new data received from the previous register. At least some of the plurality of registers included in the shift register circuit 510 may be connected to a crossbar array group (sub-processing element) included in the processing circuit 530, and may transfer input data (for example, input activation) to a plurality of crossbar arrays included in the connected crossbar array group.

From among a plurality of registers included in the shift register circuit 510, the number of registers that transfer input activation to a plurality of crossbar array groups (Sub PE 0, Sub PE 1, and Sub PE 2) may correspond to a height of a weight kernel. In an example, when a 3×3 convolution, in which a height KH of a weight kernel is 3 and a width KW of the weight kernel is 3, is performed, the number of registers that transfer input activation to a plurality of crossbar array groups (Sub PE 0, Sub PE 1, and Sub PE 2) included in one processing element PE 0 may be KH. Accordingly, when K input lines are processed by K processing elements, the total number of registers that transfer input activation to the processing circuit 530 may be KH*K. In this example, when a 3×3 convolution is performed with respect to an input activation input through K input lines, the number of output lines through which the output activation is output may correspond to K−2.

The control circuit 520 may sequentially input input activations included in an input feature map to the shift register circuit 510 according to a preset order. For example, the control circuit 520 may sequentially input input activations to the shift register circuit 510 in a row direction of the input feature map. Input activations input to the shift register circuit 510 may be sequentially shifted from the first register to the last register of the shift register circuit 510.

Also, the control circuit 520 may receive a 1-bit zero mark on every cycle, and, when the value of the zero mark is 1, may control a plurality of crossbar array groups (Sub PE 0, Sub PE 1, and Sub PE 2) so as to omit a MAC operation with respect to input activations corresponding to the zero mark. The zero mark may be input together with input feature map data of a row size, and may be used for at least one of zero padding and zero skip. In an example, as the MAC operation of crossbar arrays (when a 3×3 convolution operation is performed, 3 crossbar arrays) included in a crossbar array group corresponding to a zero mark having a value of 1 among a plurality of crossbar array groups (Sub PE 0, Sub PE 1 and Sub PE 2), is omitted, power consumption may further be reduced.

The processing circuit 530 may receive input activations from at least one of a plurality of registers, and may include a plurality of crossbar array groups (Sub PE 0, Sub PE 1 and Sub PE 2) that perform a MAC operation with respect to the received input activation and weights. A plurality of crossbar arrays (for example, Crossbar array 0, Crossbar array 1, and Crossbar array 2) included in one crossbar array group (for example, Sub PE 0) among a plurality of crossbar array groups (Sub PE 0, Sub PE 1, and Sub PE 2) may share the same input activation.

Since the number of crossbar arrays included in one crossbar array group corresponds to a width of a weight kernel, the input activation may be shared among KW crossbar arrays. In one example, when a 3×3 convolution operation is performed, three crossbar arrays may receive the same input activation and calculate an output for three weight spaces (that is, a weight row having a size of 1×3). The output for each weight space may be used to calculate different output activations from each other.

In this way, since the same input activation is shared among a plurality of crossbar arrays, the input reuse efficiency may be significantly increased and a multiplexer (MUX) for processing input data is not required when compared to typical hardware devices, and thus, a hardware structure may be significantly simplified. Also, since a digital decoder and a control logic required to operate a crossbar array are shared among the plurality of crossbar arrays, an area of hardware may also be reduced.

The processing circuit 530 accumulates and adds at least some of the operation results output from the plurality of crossbar array groups (Sub PE 0, Sub PE 1, and Sub PE 2) in units of a preset number of cycles, and thus, may obtain an output activation included in an output feature map. For example, the processing circuit 530 selects at least some of the operation results output from the plurality of crossbar array groups (Sub PE 0, Sub PE 1, and Sub PE 2), converts the selected operation results into a 2's complement format, and accumulates and adds the converted operation results, and thus, may obtain an output activation.

The processing circuit 530 may calculate a first output activation (e.g., Output data 0) by using an operation result output from one crossbar array among a plurality of crossbar arrays (e.g., Crossbar array 0, Crossbar array 1, and Crossbar array 2) included in one crossbar array group (e.g., Sub PE 0), and may calculate a second output activation (e.g., Output data 1) by using an operation result output from another one crossbar array among the plurality of crossbar arrays (e.g., Crossbar array 0, Crossbar array 1, and Crossbar array 2). Each of the operation results output from the plurality of crossbar arrays may correspond to a partial sum for calculating an output activation.

An example process of obtaining an output activation included in an output feature map by the processing circuit 530 by accumulating and adding at least some of the calculation results output from a plurality of crossbar array groups (Sub PE 0, Sub PE 1, and Sub PE 2) in units of a preset number of cycles will be described in detail below in the discussion of FIG. 6.

Figure 6:
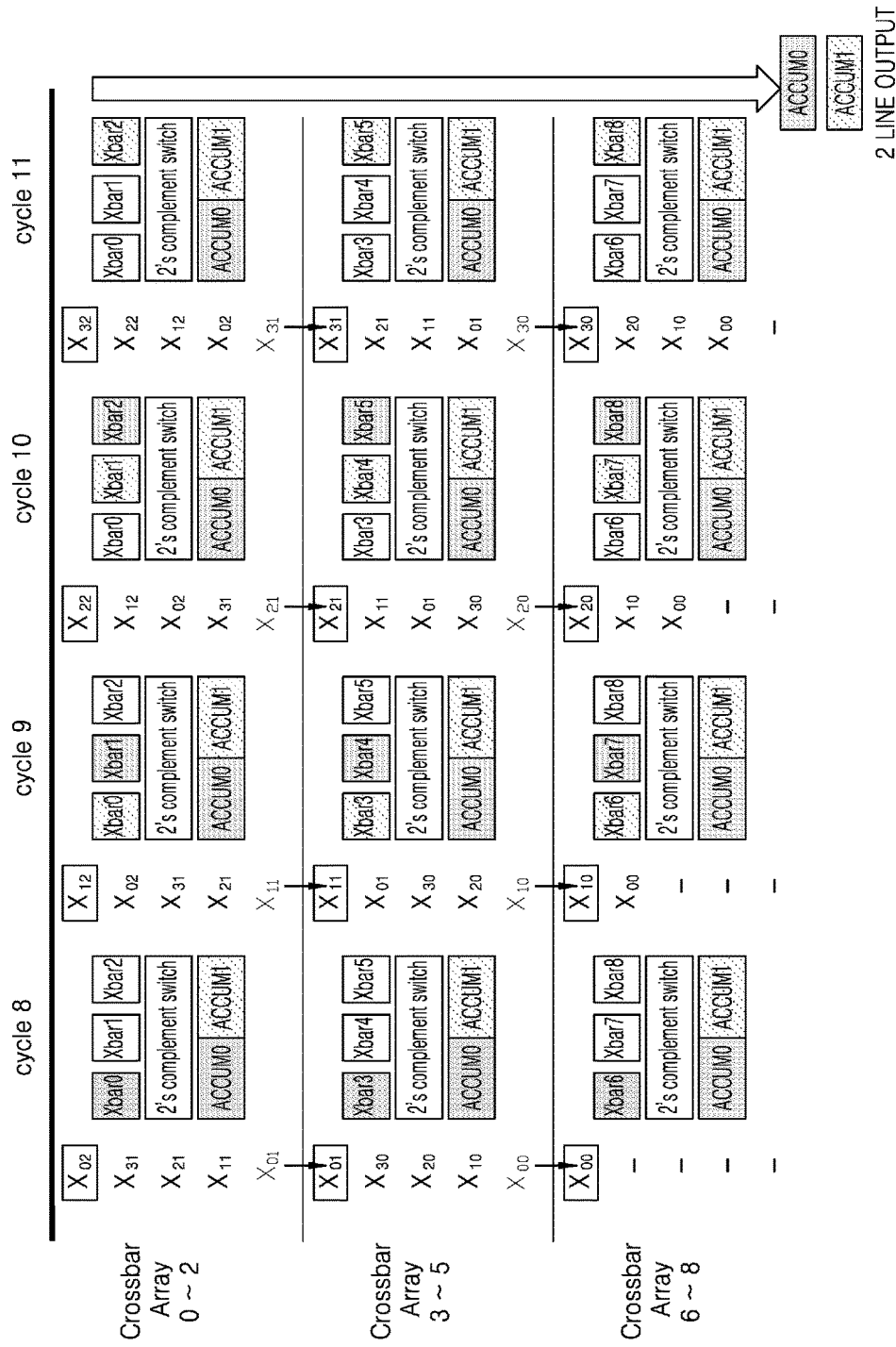
FIG. 6 is a diagram explaining a process of performing a neural network operation by a neural network device according to one or more embodiments.

FIG. 6 is a diagram for explaining a process of performing a neural network operation by a neural network device according to one or more embodiments.

In FIG. 6, an example in which the neural network device described with reference to FIG. 5 is configured to perform a 3×3 convolution operation with respect to an input feature map having a size of 4×4, including input activations of $X_{00}$ to $X_{33}$ is shown. In one example, each of 9 crossbar arrays (Xbar 0 to Xbar 8) used to perform a 3×3 convolution operation may include 128 column lines and 128 row lines, and the input activation may be data of 128 bits. However, this is only an example, and is not limited to the example.

Further, input activations included in an input feature map may be sequentially input to a shift register circuit 510 on every cycle in a row direction. For example, input activations may be input to a shift register circuit 510 in the order of $X_{00}$, $X_{10}$, $X_{20}$, and $X_{30}$, and after $X_{30}$ is input, input activations may be input to the shift register circuit 510 in the order of $X_{01}$, $X_{11}$, $X_{21}$, and $X_{31}$. Also, even afterwards, input activations up to $X_{33}$ may be sequentially input to the shift register circuit 510 in the same manner.

Since the first register of the shift register circuit 510 is connected to the first crossbar array group (Xbar 0, Xbar 1, and Xbar 2), when $X_{00}$ is input to the first register of the shift register circuit 510 in the first cycle (cycle 0), $X_{00}$ may be transferred to the first crossbar array group (Xbar 0, Xbar 1, and Xbar 2). Accordingly, the first crossbar array group (Xbar 0, Xbar 1, and Xbar 2) may perform a MAC operation using $X_{00}$ as an operand. Afterwards, $X_{00}$ may be transferred to the next register in each cycle. In the fifth cycle (cycle 4), $X_{00}$ may be transferred to a register connected to the second crossbar array group (Xbar 3, Xbar 4, and Xbar 5). Accordingly, the second crossbar array group (Xbar 3, Xbar 4, and Xbar 5) may perform a MAC operation using $X_{00}$ as an operand.

Further, FIG. 6 illustrates an operation process corresponding to a period from a ninth cycle (cycle 8) to a twelfth cycle (cycle 11) after the first cycle (cycle 0) in which $X_{00}$ is input to the shift register circuit 510.

In the ninth cycle (cycle 8), the third crossbar array group (Xbar 6, Xbar 7 and Xbar 8) may perform a MAC operation on $X_{00}$, the second crossbar array group (Xbar 3, Xbar 4 and Xbar 5) may perform a MAC operation on $X_{01}$, and the first crossbar array group (Xbar 0, Xbar 1, and Xbar 2) may perform a MAC operation on $X_{02}$. The MAC operations on $X_{00}$, $X_{01}$, and $X_{02}$ may correspond to the MAC operation with respect to the first row of the input feature map.

In the 10th cycle (cycle 9), the third crossbar array group (Xbar 6, Xbar 7 and Xbar 8) may perform a MAC operation on $X_{10}$, the second crossbar array group (Xbar 3, Xbar 4 and Xbar 5) may perform a MAC operation on $X_{11}$, and the first crossbar array group (Xbar 0, Xbar 1, and Xbar 2) may perform a MAC operation on $X_{12}$. The MAC operations on $X_{10}$, $X_{11}$, and $X_{12}$ may correspond to the MAC operation with respect to the second row of the input feature map.

In the 11th cycle (cycle 10), the third crossbar array group (Xbar 6, Xbar 7 and Xbar 8) may perform a MAC operation on $X_{20}$, the second crossbar array group (Xbar 3, Xbar 4 and Xbar 5) may perform a MAC operation on $X_{21}$, and the first crossbar array group (Xbar 0, Xbar 1, and Xbar 2) may perform a MAC operation on $X_{22}$. The MAC operations on $X_{20}$, $X_{21}$, and $X_{22}$ may correspond to the MAC operation with respect to the third row of the input feature map.

In the 12th cycle (cycle 11), the third crossbar array group (Xbar 6, Xbar 7 and Xbar 8) may perform a MAC operation on $X_{30}$, and the second crossbar array group (Xbar 3, Xbar 4 and Xbar 5) may perform a MAC operation on $X_{31}$, and the first crossbar array group (Xbar 0, Xbar 1, and Xbar 2) may perform a MAC operation on $X_{32}$. The MAC operations on $X_{30}$, $X_{31}$, and $X_{32}$ may correspond to the MAC operation with respect to the fourth row of the input feature map.

Further, in the ninth cycle (cycle 8), operation results by Xbar 0, Xbar 3, and Xbar 6 may be selected among operation results output from the crossbar array groups, in the tenth cycle (cycle 9), operation results by Xbar 1, Xbar 4 and Xbar 7 may be selected, and in the 11th cycle (cycle 10), operation results by Xbar 2, Xbar 5 and Xbar 8 may be selected. The selected operation results may be converted into a 2's complement format, and then, accumulated and added by a first accumulator (ACCUM 0), and accordingly, a final result (that is, a first output activation) of a 3×3 convolution operation corresponding to a first region 610 may be output.

Also, in the 10th cycle (cycle 9), operation results by Xbar 0, Xbar 3, and Xbar 6 may be selected among operation results output from the crossbar array groups, in the 11th cycle (cycle 10), operation results by Xbar 1, Xbar 4 and Xbar 7 may be selected, and in the 12th cycle (cycle 11), operation results by Xbar 2, Xbar 5 and Xbar 8 may be selected. The selected operation results may be converted into a 2's complement format, and then, accumulated and added by a second accumulator (ACCUM 1), and accordingly, a final result (that is, a second output activation) of a 3×3 convolution operation corresponding to a second region 620 may be output.

In this manner, two output activations may be output through two output lines during four cycles. Accordingly, compared to a neural network device of the related art in which two output activations are output during two cycles, an output bandwidth may be reduced. Also, a neural network device of the related art uses a bandwidth of 4×128 bits for two cycles. However, the neural network device according to the present embodiment uses only a bandwidth of 128 bits for one cycle, thus, an input bandwidth may be reduced to half. In this way, as the output bandwidth and the input bandwidth are reduced, power consumption may be reduced.

In FIG. 6, an example in which the number of processing elements is 4, the number of sub-processing elements is 3, and the number of crossbar arrays is 9 is described, but this is only an example. The number of output lines may be adjusted as the number of crossbar arrays included in one sub-processing element is adjusted, and neural network operations with respect to input feature maps or weight kernels of various sizes may be performed as the number of processing elements or the number of sub-processing elements is adjusted.

In one example, a first processing element that outputs an output activation through four output lines during six cycles may be implemented by adjusting the size or depth of the shift register circuit 510. In this case, the first processing element may be directly connected to the second processing element that outputs output activations through two output lines during four cycles, as described with reference to FIG. 6. The output lines of the first processing element correspond to an output of one of the plurality of layers constituting a neural network, and may be directly connected to the input lines of the second processing element corresponding to the next layer. As described above, according to the present embodiment, connections between layers may be implemented without additional memory or additional digital logic. Also, since an operation of reading/writing the input/output to the memory is omitted, power consumption may be greatly reduced.

Further, the next layer including input lines directly connected to the plurality of output lines of one layer may include at least one of a convolution layer and a pooling layer. The operation process corresponding to the convolutional layer has already been described with reference to FIG. 6, and thus, hereinafter, an example operation process corresponding to the pooling layer will be described in greater detail with reference to FIG. 7.

Figure 7:
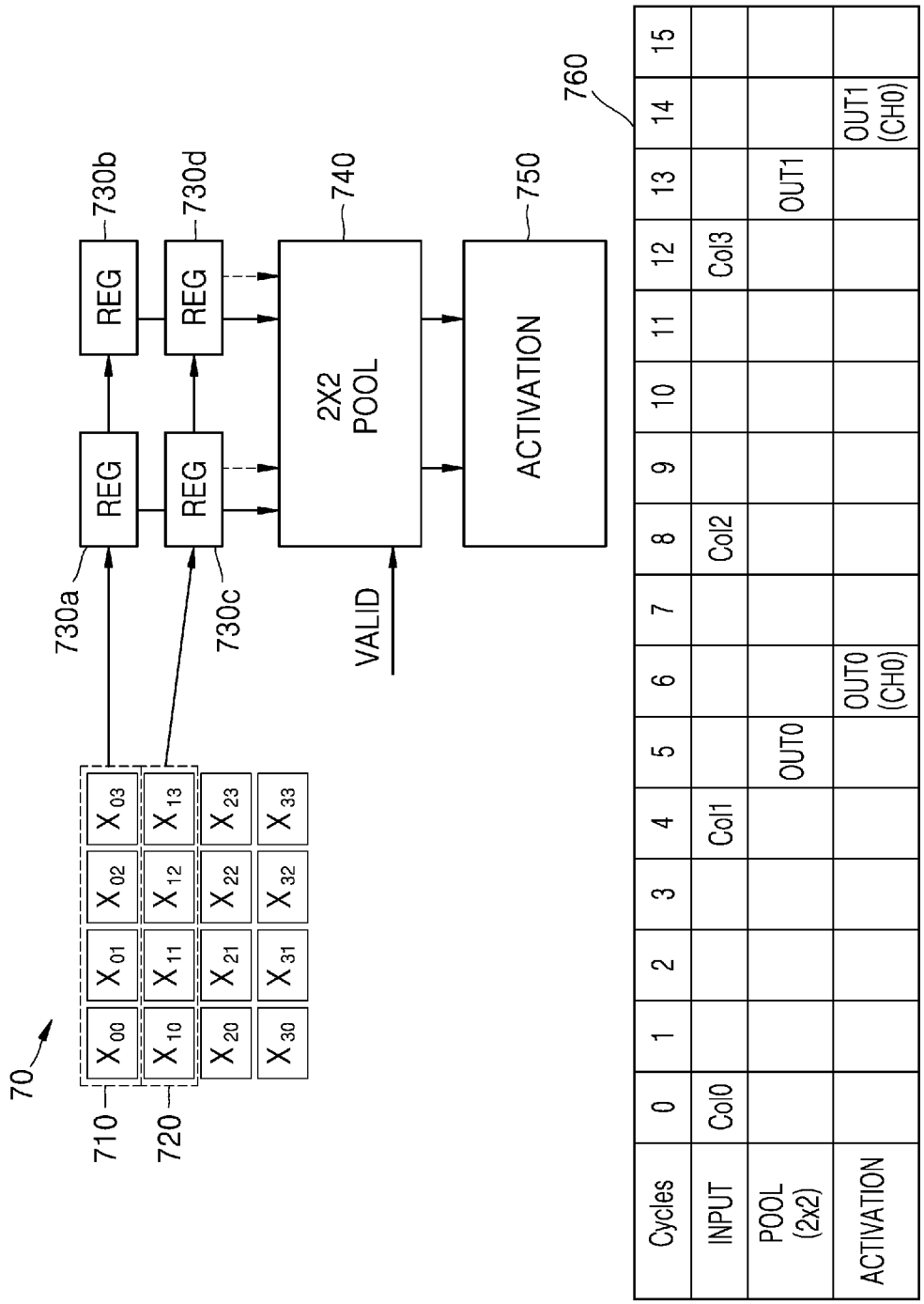
FIG. 7 is a diagram explaining a process of performing pooling and activation function operations by a neural network device according to one or more embodiments.

FIG. 7 is a diagram explaining a process of performing pooling and activation function operations by a neural network device according to one or more embodiments.

In FIG. 7, a process of performing pooling and activation function operations with reference to an output feature map 70 output by a neural network operation described with reference to FIG. 6 is illustrated as an example. A first row 710 of the output feature map 70 may correspond to output activations output through a first output line, and a second row 720 may correspond to output activations output through a second output line.

Output activations included in the first row 710 and output activations included in the second row 720 may be input to one of the plurality of pooling registers 730*a* to 730*d*. As an example, in the case when the neural network operation described above with reference to FIG. 6, two output activations are output through two output lines during four cycles. Accordingly, after $x_{00}$ and $x_{10}$ output in cycle 0 are respectively input to the pooling register 730*a* and the pooling register 730*c*, $x_{00}$, and $x_{11}$ outputted after four cycles (that is, in cycle 4) may be respectively input to the pooling register 730*a* and the pooing register 730*c*.

As $x_{01}$ and $x_{11}$ are newly input to the pooling register 730*a* and the pooling register 730*c*, respectively, $x_{00}$ and $x_{10}$ stored in the pooling register 730*a* and the pooling register 730*c* may be transferred to a pooling register 730*b* and a pooling register 730*d*, respectively. Accordingly, the pooling register 730*a* may store $x_{01}$, the pooling register 730*b* may store $x_{00}$, the pooling register 730*c* may store $x_{11}$, and the pooling register 730*d* may store $x_{10}$.

A pooling operator 740 may perform a 2×2 pooling operation after receiving output activations from the plurality of pooling registers 730*a* to 730*d*. Accordingly, the result of the pooling operation for $x_{00}$, $x_{10}$, $x_{01}$, and $x_{11}$ may be output in cycle 5. The pooling operation may be max pooling, average pooling, L2-norm pooling, etc., but is not limited thereto. In an example, when the pooling operation corresponds to max pooling, a maximum value among $x_{00}$, $x_{10}$, $x_{01}$, and $x_{11}$ may be output from the pooling operator 740.

An activation function 750 may apply an activation function to the result of the pooling operation received from the pooling operator 740. Accordingly, in cycle 6, a final output to which the activation function is applied may be output. Afterwards, in cycle 8, new output activations are output through the output lines, and the process described above may be repeated. An overall timing diagram of a process in which the neural network device is configured to perform pooling and activation function operations is shown in table 760.

In this way, the neural network device according to the present embodiment may directly connect output lines of a convolution layer to the pooling layer without an additional buffer. In FIG. 7, for convenience of explanation, a 2×2 pooling with a stride of 2 has been shown, but is not limited thereto. Pooling operations of various sizes may be performed according to the structure of a pooling layer.

Figure 8:
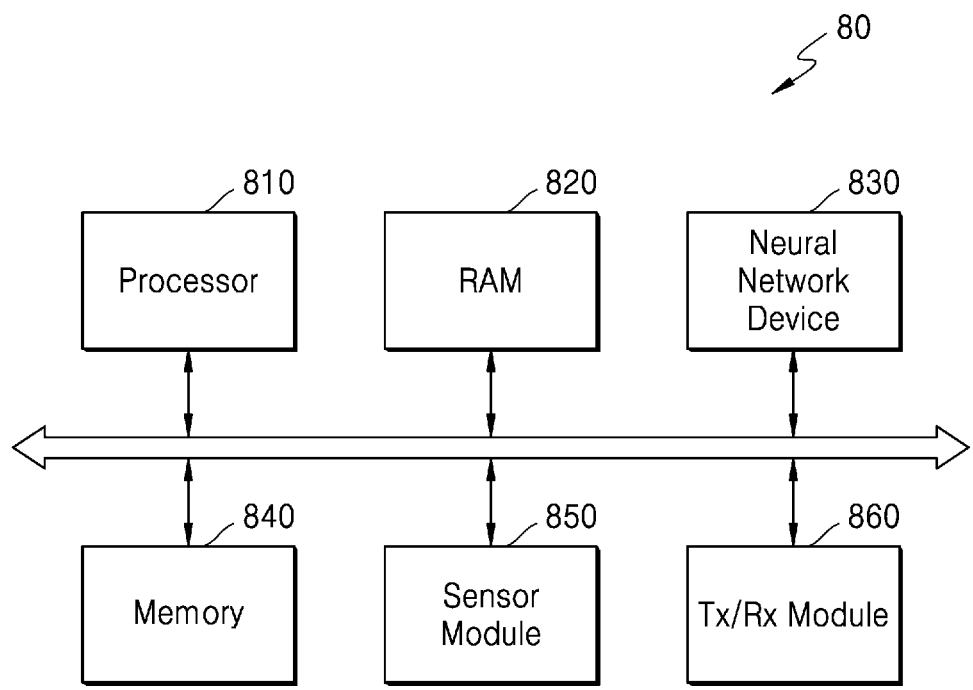
FIG. 8 is a block diagram illustrating a configuration of an electronic system according to one or more embodiments.

FIG. 8 is a block diagram illustrating a configuration of an electronic system according to one or more embodiments.

In FIG. 8, the electronic system 80 may extract valid information by analyzing input data in real time based on a neural network and determine a situation or control the configuration of a device including the electronic system 80 based on the extracted information, noting the electronic device and the discussed neural network are also representative of another one of such a device. For example, the electronic system 80 may be applied to, or representative of, a robotic device, such as a drone or an advanced driver assistance system (ADAS), a smart TV, a smart phone, a medical device, a mobile device, an image display device, a measurement device, an IoT device and various other types of electronic devices, as non-limiting examples.

The electronic system 80 may include a processor 810, a RAM 820, a neural network device 830, a memory 840, a sensor module 850, and a communication module 860. The electronic system 80 may further include an input/output module, a security module, and a power control device. Some of hardware components of the electronic system 80 may be mounted on at least one semiconductor chip.

The processor 810 controls an overall operation of the electronic system 80. The processor 810 may include a single processor core (Single Core) or a plurality of processor cores (Multi-Core). The processor 810 may process or execute instructions and/or data stored in the memory 840. In one or more embodiments, the processor 810 may control functions of the neural network device 830 by executing instructions stored in the memory 840. The processor 810 may be implemented by a central processing unit (CPU), a graphics processing unit (GPU), an application processor (AP), etc.

The RAM 820 may temporarily store instructions, data, or instructions. For example, instructions and/or data stored in the memory 840 may be temporarily stored in the RAM 820 according to the control or booting code of the processor 810. The RAM 820 may be implemented as a memory, such as dynamic RAM (DRAM), static RAM (SRAM), etc.

The neural network device 830 may perform an operation of the neural network based on received input data and generate an information signal based on the execution result. Neural networks may include convolution neural networks (CNN), recurrent neural networks (RNN), deep belief networks, restricted Boltzmann machines, etc., but are not limited thereto. The neural network device 830 may be a hardware accelerator dedicated to the neural network or a device including the same, and may correspond to the neural network device described above with reference to FIGS. 4 to 7.

The neural network device 830 may control a plurality of crossbar arrays so that the plurality of crossbar arrays share and process the same input data by using a shift register circuit 510, and select at least some of operation results output from the plurality of crossbar arrays. Also, the neural network device 830 may acquire a final output by accumulating and adding the selected operation results in units of a preset number of cycles. Accordingly, input reuse is increased and the number of memory access is decreased when compared to typical hardware devices, and thus, power consumption for driving the neural network device 830 may be reduced.

An information signal may include one of various types of recognition signals, such as a voice recognition signal, an object recognition signal, an image recognition signal, and a biometric information recognition signal. For example, the neural network device 830 may receive frame data included in a video stream as input data and generate, on the basis of the frame data, a recognition signal with respect to an object included in an image displayed by the frame data. However, examples are not limited thereto, and the neural network device 830 may receive various types of input data according to the type or function of an electronic device on which the electronic system 80 is mounted, and alternatively also representative of, and generate a recognition signal according to the input data.

The memory 840 is a storage for storing data and may store an operating system (OS), various instructions, programs, and various data. In an embodiment, the memory 840 may store intermediate results generated in a process of performing an operation of the neural network device 830.

The memory 840 may be DRAM, but is not limited thereto. The memory 840 may include at least one of volatile memory and nonvolatile memory. The non-volatile memory includes ROM, PROM, EPROM, EEPROM, flash memory, PRAM, MRAM, RRAM, FRAM, etc. The volatile memory includes DRAM, SRAM, SDRAM, PRAM, MRAM, RRAM, FeRAM, etc. In an embodiment, the memory 840 may include at least one of HDD, SSD, CF, SD, Micro-SD, Mini-SD, xD and Memory Stick.

The sensor module 850 may collect information around an electronic device on which the electronic system 80 is mounted. The sensor module 850 may sense or receive a signal (e.g., an image signal, a voice signal, a magnetic signal, a bio signal, a touch signal, etc.) from the outside of the electronic device and convert the sensed or received signal into data. To this end, the sensor module 850 may include at least one of various types of sensing devices, for example, a microphone, an imaging device, an image sensor, a light detection and ranging (LiDAR) sensor, an ultrasonic sensor, an infrared sensor, a bio sensor, and a touch sensor.

The sensor module 850 may provide converted data as input data to the neural network device 830. For example, the sensor module 850 may include an image sensor, generate a video stream by photographing an external environment of the electronic device, and sequentially provide successive data frames of the video stream to the neural network device 830 as input data. However, the present embodiment is not limited thereto, and the sensor module 850 may provide various types of data to the neural network device 830.

The communication module 860 may include various wired or wireless interfaces capable of communicating with external devices. For example, the communication module 860 may include a local area network (LAN), a wireless local area network (WLAN), such as Wi-Fi, a wireless personal area network (WPAN), such as Bluetooth, a wireless universal serial bus (USB), ZigBee, near-field communication (NFC), radio-frequency identification (RFID), power-line communication (PLC), or a communication interface capable of connecting to a mobile cellular network, such as 3rd generation (3G), 4th generation (4G), long-term evolution (LTE), or 5th generation (5G).

Figure 9:
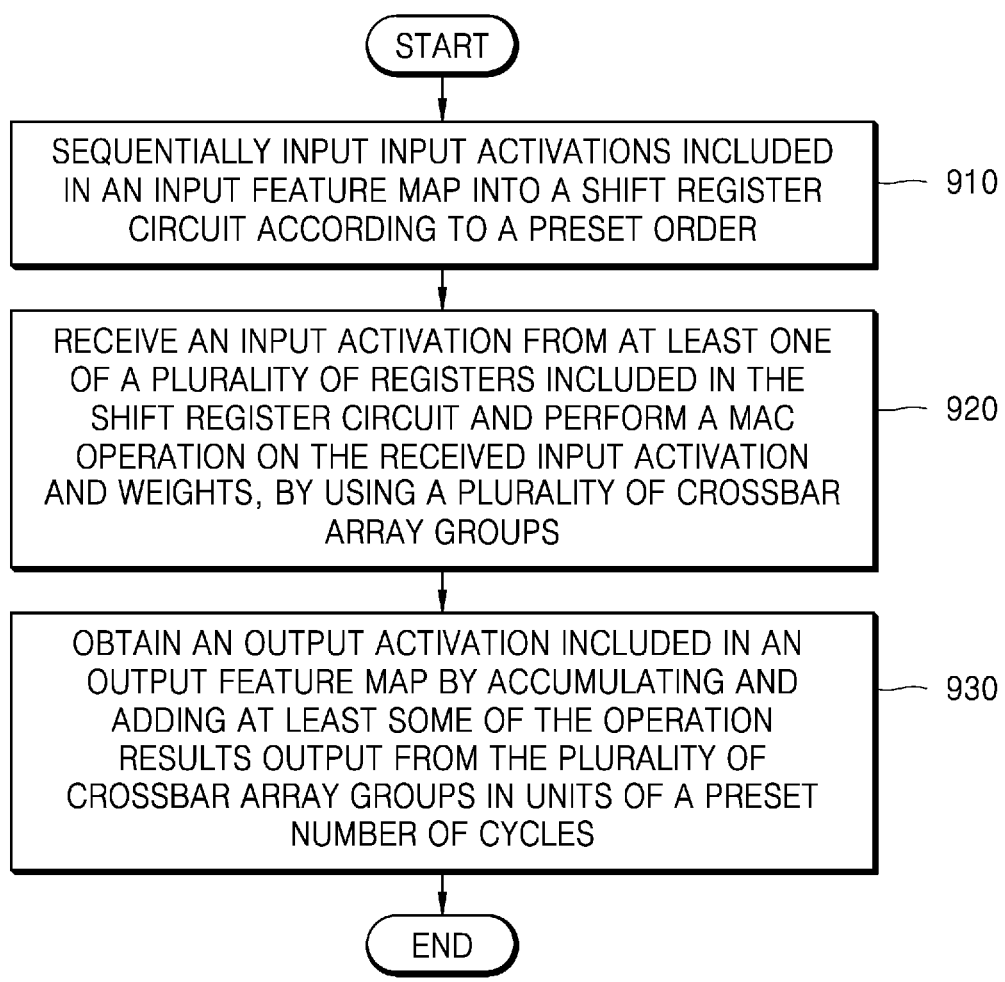
FIG. 9 is a flowchart illustrating an operating method of a neural network device according to one or more embodiments.

FIG. 9 is a flowchart illustrating an operating method of a neural network device according to one or more embodiments.

In FIG. 9, a method of operating a neural network device includes operations processed in a time series in the neural network device illustrated in FIGS. 4 to 7. Accordingly, it may be seen that even though omitted below, the descriptions given with respect to FIGS. 4 to 7 may also be applied to the operating method of the neural network device of FIG. 9.

In operation 910, a neural network device may sequentially input input activations included in an input feature map into a shift register circuit 510 according to a preset order. The shift register circuit 510 may include a plurality of registers that transfer stored data to the next register in every cycle and store new data received from the previous register.

In an example, the neural network device may sequentially input input activations to the shift register circuit 510 in a row direction of the input feature map. The input activations input to the shift register circuit 510 may be sequentially shifted from the first register to the last register of the shift register circuit 510.

On the other hand, the neural network device may receive a 1-bit zero mark in every cycle and, when the value of the zero mark is 1, may control a plurality of crossbar array groups to omit a MAC operation with respect to the input activations corresponding to the zero mark. The zero mark may be input to the shift register circuit 510 together with row-sized input activations, or may be separately stored. However, the present embodiment is not limited thereto.

In operation 920, the neural network device may receive an input activation from at least one of a plurality of registers included in the shift register circuit 510 and perform a MAC operation on the received input activation and weights, by using a plurality of crossbar array groups. A plurality of crossbar arrays included in one crossbar array group among a plurality of crossbar array groups may share the same input activation. Accordingly, the input reuse efficiency may be significantly increased and a MUX for processing input data is not required, and thus, a hardware structure may be significantly simplified. Also, since a digital decoder and control logic required to operate the crossbar array are shared among the plurality of crossbar arrays, an area of hardware may be reduced when compared to typical hardware devices.

In this example, the number of crossbar arrays included in one crossbar array group corresponds to a width of a weight kernel, and the number of registers that transfer an input activation to the plurality of crossbar array groups among the plurality of registers may correspond to a height of the weight kernel. The circuit structure of a neural network may be adjusted to perform a neural network operation corresponding to the size of the weight kernel.

In operation 930, the neural network device may obtain an output activation included in an output feature map by accumulating and adding at least some of the operation results output from the plurality of crossbar array groups in units of a preset number of cycles. For example, the neural network device selects at least some of the operation results output from the plurality of crossbar array groups, converts the selected operation results into a 2's complement format, and accumulates and adds the converted operation results, and thus, may obtain an output activation.

The neural network device may calculate a first output activation by using an operation result output from one crossbar array among a plurality of crossbar arrays, and calculate a second output activation by using an operation result output from another crossbar array among the plurality of crossbar arrays.

The processing block, processing block 4, control circuit, processing elements, sub-processing elements, crossbar arrays, pooling registers, pooling operator, activation function, shift register circuit 510, control circuit 520, processing circuit 530, electronic system 80, processor 810, RAM 820, neural network device 830, memory 840, sensor module 850, and a communication module 860 in FIGS. 1-9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network device comprising:
a shift register circuit comprising registers configured to, in each cycle of plural cycles, transfer stored data to a next register and store new data received from a previous register;
a control circuit configured to sequentially input data of input activations included in an input feature map into the shift register circuit in a preset order; and
a processing circuit, comprising crossbar array groups that receive the input activations from at least one of the registers and perform a multiply-accumulate (MAC) operation with respect to the received input activation and weights, configured to select at least some of operation results output from the crossbar array groups at a preset number of cycles to be converted and accumulate and add the at least some operation results using a result of the converted to obtain an output activation in an output feature map.

2. The neural network device of claim 1, wherein the control circuit is further configured to receive a 1-bit zero mark on each of the plural cycles, and in response to a value of the zero mark being 1, to control the crossbar array groups to omit a MAC operation with respect to input activations corresponding to the zero mark.

3. The neural network device of claim 1, wherein crossbar arrays included in one crossbar array group of the crossbar array groups share a same input activation.

4. The neural network device of claim 3, wherein each of the crossbar arrays comprises:
a plurality of row lines;
a plurality of column lines intersecting the plurality of row lines; and
memory cells respectively disposed at the intersections of the plurality of row lines and the plurality of column lines, and configured to store the weights included in a weight kernel.

5. The neural network device of claim 3, wherein the processing circuit is further configured to obtain a first output activation using an operation result output from one of the crossbar arrays, and obtain a second output activation using an operation result output from another of the crossbar arrays.

6. The neural network device of claim 3, wherein a number of the crossbar arrays included in the one crossbar array group corresponds to a width of a weight kernel.

7. The neural network device of claim 1, wherein a number of registers that transfer input activation to the crossbar array groups from the registers corresponds to a height of a weight kernel.

8. The neural network device of claim 1, wherein the processing circuit is further configured to convert the selected operation results into a 2's complement format, and accumulate and add the converted operation results to obtain the output activation.

9. The neural network device of claim 1, wherein
the processing circuit comprises an output line through which the output activation is output, and
the output line corresponds to an output of one of a plurality of layers constituting a neural network, and is directly connected to an input line of a next layer.

10. The neural network device of claim 9, wherein the next layer comprises either one or both of a convolution layer and a pooling layer.

11. A method of a neural network device, the method comprising:
sequentially inputting input activations included in an input feature map into a shift register circuit in a preset order;
receiving an input activation of the input activations from at least one of a plurality of registers, of the shift register circuit, corresponding to a corresponding crossbar array group of crossbar array groups and performing a multiply-accumulate (MAC) operation on the received input activation and weights; and
obtaining an output activation included in an output feature map by selecting at least some of operation results output from the crossbar array groups at a preset number of cycles to be converted and accumulating and adding the at least some of operation results based on a result of the converted.

12. The method of claim 11, further comprising:
receiving a 1-bit zero mark on each cycle of the sequentially inputting of the input activations; and
in response to the a value of the zero mark being 1, controlling the crossbar array groups to omit the MAC operation with respect to input activations corresponding to the zero mark.

13. The method of claim 11, wherein crossbar arrays included in one crossbar array group of the crossbar array groups share a same input activation.

14. The method of claim 13, wherein each of the crossbar arrays comprises:
a plurality of row lines;
a plurality of column lines intersecting the plurality of row lines; and
memory cells respectively disposed at the intersections of the plurality of row lines and the plurality of column lines, and configured to store the weights of a weight kernel.

15. The method of claim 13, further comprising:
obtaining a first output activation using an operation result output from one of the crossbar arrays; and
obtaining a second output activation using an operation result output from another crossbar array of the crossbar arrays.

16. The method of claim 13, wherein a number of the crossbar arrays included in the one crossbar array group corresponds to a width of a weight kernel.

17. The method of claim 11, wherein a number of registers that transfer input activation to the crossbar array groups from the plurality of registers corresponds to a height of a weight kernel.

18. The method of claim 11, wherein the obtaining the output activation comprises:
   converting the selected operation results into a 2's complement format; and
   accumulating and adding the converted operation results.

19. The method of claim 11, further comprising outputting the output activation via an output line, wherein the output line corresponds to an output of one of a plurality of layers constituting a neural network, and is directly connected to an input line of a next layer.

20. The method of claim 19, wherein the next layer comprises either one or both of a convolutional layer and a pooling layer.

* * * * *